Patented Apr. 21, 1953

2,635,984

UNITED STATES PATENT OFFICE 2,635,984

PROCESS OF PREPARING ANTIGEN-RICH BACTERIAL TOXINS AND TOXOIDS

Floyd H. Eggert, Kenosha, Wis.

No Drawing. Application January 31, 1948, Serial No. 5,676

6 Claims. (Cl. 167—78)

The present invention relates to biological preparations, and in particular antigen preparations. More specifically the present invention relates to improved processes for obtaining therapeutically useful antigen-rich toxoids and toxins.

Antigen preparations such as the diphtherial and tetanal toxoids and the scarlet fever toxins have been available in crude form for some years. These unrefined preparations obtained directly from the broth in which the bacteria are grown, are relatively low in the desired antigenic power, and are also contaminated with culture media constituents including pigments, degraded proteins, bacterial products, etc. Some of these foreign compositions found in crude preparations are particularly toxic and have been known to elicit severe reactions in human beings. In view of the above and other objectionable features of the crude preparations, numerous attempts have been made to concentrate and purify toxoids and toxins. The methods generally employed were salt precipitation, acid precipitation and the like. Leonard, G. F., and Holm, A., J. Infect. Dis. 53, 376 (1933). A complex lengthy procedure involving ultrafiltration, adsorption, and elution, for use in preparing diphtherial toxoid concentrates has also been proposed. Pope, C. G., and Linggood, F. V., Brit. J. Exp. Path., 20, 297 (1939). These prior methods were found to give poor yields of the desired antigens or yields with low degree of purity, and in some cases antigen denaturation with resulting loss of the antigenicity of the toxoid or toxin.

An improved concentration and purification process involving a multiphase system of fractionation with precise adjustment of methanol concentration, pH, ionic strength and protein concentration under rigidly controlled conditions of temperature has recently been proposed. Pillemer et al. J. Bio. Chem. 170, 571 (1947). This latter method, while a distinct improvement over the previously proposed processes, possesses nevertheless certain objectionable features. Included among these features or disadvantages is the necessity for using rigidly controlled low temperatures of about −5° C. or below. This requirement makes the use of "cold rooms" and expensive refrigerating equipment essential. Another disadvantage is the time consumed (about 3-5 days) in carrying out the methanol fractionations. Aside from added expense, this is particularly objectionable for the longer the antigens are in contact with foreign chemicals such as methanol and the like, the greater the danger of denaturization resulting in unstable preparations or loss of antigenic potency. In addition, still other disadvantages are the specific conditions (methanol concentration, pH, ionic strength, etc.,) which must be precisely observed in the various fractionating steps to obtain the desired results. The art has been attempting for some time to provide a relatively simple, economically feasible or commercially practical and inexpensive process for preparing in high yields antigen preparations in the form desired for use in the medical field.

The principal object of the present invention is to provide an improved process for preparing antigen concentrates.

Another object of the present invention is to provide a relatively simple, commercially practical process for obtaining improved toxoid and toxin concentrates from crude antigen preparations.

Other objects will be apparent as the detailed description proceeds hereinafter.

I have discovered a new and relatively inexpensive process for preparing antigen-rich concentrates from crude antigen compositions. The new process provides for the isolation of substantially all of the antigens by a relatively simple procedure at room temperatures and has proven particularly adaptable for use in large scale operations.

The improved process of the present invention comprises two basic steps. In the first or initial step the antigens are adsorbed on an organic adsorbent in an aqueous medium and in the second or last step the adsorbed antigens are liberated and precipitate as antigen concentrates as the adsorbent is dissolved in an organic solvent medium. The complete process is carried out at room temperatures in standard relatively inexpensive apparatus. This is of particular importance from a commercial point of view, for aside from avoiding the inherent difficulties of working at rigidly controlled low temperatures, the use of room temperatures makes the use of expensive refrigerating equipment unnecessary in the process of the present invention. Another advantage resides in the time element, as the process of the present invention may be completed in one day or less, during which time the antigens in the process of the present invention are only in contact with the organic solvent for 2 to 3 hours at a maximum. As a result, the danger of the organic solvent having a deleterious effect on the antigenic active proteins is kept at a minimum. The process of the present invention also gives exceptionally high yields, e. g.

recovers consistently 85-95 per cent of the original antigens present in the crude preparations. In addition and of utmost importance, the antigen concentrates of the present invention have been found to be substantially free from culture media constituents including bacterial products and the like of the type which produce undesired reactions upon administration.

The following examples will serve to illustrate the present invention.

Example I.—Diphtherial toxoids

About 15,000 cc. of crude detoxified diphtherial toxin (toxoid) is adjusted to a pH of about 7.0 either by the addition of dilute aqueous sodium hydroxide or sodium carbonate or hydrochloric acid, depending upon whether the crude toxoid solution is acid or alkaline to the desired pH. In most cases the crude solutions have a pH on the acid side and the addition of sufficient alkaline material to provide a pH of at least about the neutral point is desired. About 900 grams of sodium benzoate is next added to the toxoid solution and the resulting mixture is stirred until the benzoate salt is completely dissolved. Hydrochloric acid (either dilute or concentrated) is then slowly added to the solution until the pH drops to about 4.8-5.0. (With toxoids prepared using the well known Taylor's hog stomach digest medium and detoxified with formaldehyde in accordance with standard practices, about 300 cc. of U. S. P. quality HCl is usually required for the above proportions. The solution is stirred vigorously during the addition of the hydrochloric acid and for about fifteen minutes or more thereafter to assure complete adsorption of the toxoid on the minute crystals of benzoic acid which form in situ as the pH drops below 7.

The benzoic acid precipitate containing the adsorbed toxoid is separated from the solution, e. g. by decantation or preferably by filtration under vacuum, and the resulting cake is thoroughly washed with a saturated benzoic acid solution. To free the cake from any undesirable products that may remain after washing, the benzoic acid may be resuspended by vigorously agitating the cake in about 5000 cc. of a saturated benzoic acid solution, and then refiltered and washed as described above. The resulting precipitate or benzoic acid cake with adsorbed toxoid is then pressed (e. g. with a spatula) while under vacuum filtration so as to remove mechanically as much of the excess moisture as possible. A cake containing about 66 per cent by weight of water is satisfactory for processing as described below.

The partially dried cake is now removed to a suitable container and vigorously stirred with about 2000 to 3000 cc. of acetone, sufficient acetone being employed to provide a final acetone concentration of about 60-65 per cent. During this operation the benzoic acid dissolves in the acetone and the adsorbed toxoid is liberated as a precipitate in the acetone-benzoic acid solution. If the toxoid concentrate (which may appear as a hazy suspension) does not precipitate immediately it may be made to flocculate and settle out rapidly by addition of small amounts of an electrolyte, e. g. 0.5% sodium benzoate, to the acetone soltion. While the precipitate may be removed from the solution in any desired manner, it is preferred to separate the precipitate rapidly by filtration using soft filter paper under vacuum. A small amount of an inert, previously washed diatomaceous material such as Johns Manville "Filter Cel" may be employed to hasten filtration. The resulting precipitate is next washed thoroughly with 65-70% aqueous acetone in order to remove traces of benzoic acid and is then dried free of acetone as rapidly as possible under continued vacuum. The acetone-free toxoid may be dried completely under vacuum and be stored as a stable dry powder or be reconstituted in such solvents as 0.15 M NaCl (saline), 0.3 M glycine, etc., to form stable solutions. In solution form the toxoids are preferably buffered at a pH of about 6.7-6.8 with primary or secondary phosphates of sodium, in order to protect the antigen from material change in pH and possible loss of antigenic value. Alum precipitated products may also be prepared by treating the antigen concentrates with alum in accordance with standard practices in the art.

Example II.—Tetanal toxoid

About 30,000 cc. of crude detoxified tetanal toxin (toxoid) is adjusted to a pH of about 7.0-7.5 by addition of dilute aqueous sodium carbonate. About 1800 grams of sodium benzoate is next added to the neutral or slightly alkaline solution and the resulting mixture is stirred until the benzoate salt is dissolved. Dilute hydrochloric acid is then slowly added to the solution until the pH drops to about 4.0-5.2. The solution is stirred vigorously during the addition of the mineral acid and for a short time thereafter to assure complete adsorption of the toxoid on the crystals of benzoic acid which form in the acid solution as the pH drops below 7. The resulting benzoic acid precipitate or cake with the adsorbed toxoid is then separated from the aqueous reaction mixture, dissolved in about 5,000 cc. of acetone and worked up in accordance with Example I. The tetanal toxoid concentrate obtained may also be dried in vacuum and stored as a dry powder or be reconstituted in aqueous isotonic saline solutions, glycine soltions, etc., as described above with reference to the diphtherial toxoid concentrate.

Example III.—Scarlet fever toxin

About 15,000 cc. of crude scarlet fever antigens (toxin) is adjusted to a pH of about 7.0 either by the addition of dilute aqueous sodium hydroxide or sodium carbonate or hydrochloric acid, depending upon whether the crude toxin solution is acid or alkaline to the desired pH. In most cases the crude solutions are acidic and the addition of alkaline material to provide a pH of at least around the neutral point, i. e. a point at which the salt of the organic acid adsorbent is readily soluble, is generally desired. About 900 grams of sodium benzoate is next added to the toxin solution and the resulting mixture is stirred until the benzoate salt is completely dissolved. Hydrochloric acid (either dilute or concentrated) is then slowly added to the solution until the pH drops to about 4.8-5.0. (The amount of acid required to provide the desired pH varies somewhat depending on the culture media employed in the preparation of the antigens.) The solution is stirred vigorously during the addition of the hydrochloric acid and preferably for a short time thereafter to assure complete adsorption of the toxin on the minute crystals of benzoic acid which form in situ as the pH drops below 7.

The benzoic acid precipitate containing the adsorbed toxin is separated from the solution by filtration under vacuum and preferably worked up (purified) as described in Example I. The partially dried benzoic acid cake with adsorbed toxin is next vigorously stirred in about 2500 cc. of acetone. During this operation the benzoic acid dissolves in the acetone and the adsorbed toxin is liberated as a precipitate in the acetone-benzoic acid solution. The resulting toxin precipitate is separated from the acetone solution, washed with 65-70% aqueous acetone and dried free from acetone as rapidly as possible and preferably under vacuum in accordance with the procedure employed in Example I. The acetone-free toxin may be dried completely under vacuum and be stored as a stable dry powder or be reconstituted in such solvents as 0.15 M NaCl, 0.3 M glycine, etc., to form stable solutions as described above with reference to the diphtherial toxoid concentrate.

*Example IV.—Soluble pertussal antigens*

About 15,000 cc. of crude pertussal antigens (toxin) obtained from a media inoculated with *Haemophilus pertussis,* the causative agent of whooping cough, is adjusted to a pH of about 7.0–7.5 by addition of dilute aqueous sodium carbonate. About 900 grams of sodium benzoate is next added to the neutral or slightly alkaline solution and the resulting mixture stirred until the benzoate salt is dissolved. Dilute hydrochloric acid is then slowly added to the solution until the pH drops to about 4.0–5.2. The solution is stirred vigorously during the addition of the mineral acid and for a short time thereafter to assure complete adsorption of the toxin on the crystals of benzoic acid which form in the acid solution as the pH drops below 7. The resulting benzoic acid precipitate or cake is then separated from the aqueous reaction mixture, dissolved in about 2,500 cc. of acetone and worked up in accordance with Example I. The pertussal toxin concentrate obtained may also be dried in vacuum and stored as a dry powder or be reconstituted in aqueous isotonic saline solutions, glycine solutions, etc., as described above with reference to the scarlet fever toxin concentrate.

In the above examples the crude aqueous antigen solutions may be adjusted to the desired pH by the addition of any acidic or alkaline material although the use of mineral acids such as hydrochloric acid and alkaline materials such as the alkali metal carbonates and bicarbonates are generally preferred. The preferred solubilizing pH is around pH 7 or the neutral point although crude antigen solutions having an alkaline or slightly acidic pH may be employed as long as the absorbent acid or salt thereof is soluble at the pH of the crude solution. Where the crude solution has an alkaline pH adjustment is generally not necessary. The sodium benzoate employed in the examples although preferred, may be replaced by other water soluble alkali metal benzoate salts as well as by other water soluble salts of other adsorbent organic acids such as the alkali metal (sodium, potassium, etc.) salts of salicylic acid and the barbituric acids such as sodium pentobarbital. Water soluble salts of other organic acids may be employed as long as the free acid is insoluble in acidic solutions and will effectively selectively adsorb the desired antigens. Benzoic acid, however, has been found to be a particularly effective differential adsorbent for concentrating the desired antigens from the toxic nitrogenous and non-nitrogenous extraneous substances present in the crude antigen solutions.

The free adsorbent organic acid may also be used in place of water soluble salts thereof if desired. If the free organic acid is added to a crude alkaline antigen solution the acid may be converted at least in part (depending on the amount of alkali present) to a water soluble salt and be precipitated along with any undissolved acid upon the addition of the mineral acid as described in the examples. It is also possible to use the free organic acid in powdered form with crude neutral or acidic antigen solutions, although as the particle size of the powdered acids is normally larger than free acids formed in situ in accordance with the examples, the surface of the powdered acid is less, and more powdered acid is therefore required to effect a given degree of adsorption. The organic acids which precipitate in the solution as minute particles have proven to be particularly effective adsorbents (the antigens are adsorbed as the acid is formed in situ), and it is for this reason that the process described in the examples is preferred in commercial practice.

In the above examples, the hydrochloric acid employed to precipitate the adsorbent (organic) acid in the crude antigen solution may be replaced by other acids capable of precipitating the organic acid although the use of a relatively strong mineral acid like HCl, $H_2SO_4$, etc. is preferred. With the benzoates of the examples sufficient acid should be added to provide the solution with a pH of about 4.0–5.2, with a range of 4.8–5.0 being preferred. Sufficient acid should be added in any event to react with a portion of the soluble salt and free sufficient insoluble absorbent acid to adsorb the antigens. The acetone employed in the examples may also be replaced with other inert organic solvents capable of dissolving the free adsorbent acid. Examples include water miscible solvents such as methyl and ethyl alcohols, partially water miscible solvents such as butyl alcohol and ether, and practically water immiscible solvents such as toluene, chloroform and trichlorethylene. While a wide variety of solvents are usable, those named are more effective than solvents such as benzene and gasoline and are therefore preferred.

The water immiscible solvents may be employed in the process of the present invention to particular advantage in the preparation of antigen concentrates from crude solutions contaminated with chromogenic material. The following example will serve for illustrative purposes.

*Example V.—Diphtherial toxoids*

A crude diphtherial toxoid solution containing reddish pigments known as porphyrins is first worked up and the antigens adsorbed on benzoic acid as described in Example I. After washing the semi dry benzoic acid precipitate or cake with adsorbed antigens is stirred vigorously in about 4 to 5 times its weight of toluene (or chloroform). This produces an emulsion which is then washed with water to free it from the pigments and other extraneous material. Apparently, the water immiscible solvent forms a protective coating for the individual particles of antigen, protecting them from being dissolved in the water, while still acting somewhat as a membrane through which the water may reach and dissolve out the more soluble chromogenic material. After washing, the emulsion is treated with about an equal volume of acetone which breaks the toluene emulsion and dissolves out any remaining benzoic acid and liberates the free antigen as a concentrated precipitate. The resulting precipitate substantially free from chromogenic material is separated, e. g. by centrifugation, worked up as in Example I and is then dried or reconstituted in stable solutions as described above.

While this example employing a water immiscible solvent involves greater expense than the processes of the other examples, it does have the advantage that the emulsion may, if for any reason it is desired to do so, be allowed to stand for as long as one or two days without appreciable loss of antigenic potency. Also, in this process it is not necessary to have the antigens in contact for more than five to ten minutes with the water miscible solvents such as acetone which tend to denature the active antigenic proteins.

The processes of the present invention, while adaptable for use with crude solutions containing a relatively high percentage of antigens, have also proven of particular value for recovering antigen-rich concentrates from crude solutions of low titer heretofore considered of no practical value. The processes of the present invention have also proven to be substantially free from the protein denaturization problem, i. e. loss in antigenicity of the recovered toxoid or toxin concentrates. This is due in part to the fact that in the process of the present invention the antigens are first concentrated on the adsorbent in an aqueous medium and freed from a substantial proportion of the contaminates in the culture media before being brought in contact with organic solvents which tend to denature the antigenic proteins. As a result the amounts of the relatively expensive organic solvents employed and the time the antigens are in contact with the solvents may be kept at a minimum. The proportions given in the above examples are merely illustrative although sufficient adsorbent should be employed to adsorb the antigens present in the crude solutions, and sufficient organic solvent should be employed to dissolve the adsorbent. The optimum amounts of materials vary somewhat depending upon the culture media (hog stomach digest, peptone-veal broth, etc.) employed to prepare the crude solutions, as well as the particular toxoid or toxin being processed.

I have also discovered that the process of the present invention may be advantageously employed to prepare improved liver extract concentrates particularly rich in the desired pernicious anemia (P. A.) factor. The following example will serve for illustrative purposes.

*Example VI.—Liver extract concentrate*

About 10,000 cc. of crude liver extract (e. g. obtained by extracting fresh livers with an aqueous or aqueous-20% ethanol extract in accordance with standard practices) is first adjusted to a pH of about 7.0-7.5. pH adjustment is not necessary if the extract is already at the neutral point or on the alkaline side. About 600 grams of sodium benzoate is next added to the neutral or alkaline solution and the resulting mixture stirred until the benzoate salt is dissolved. Hydrochloric acid (either dilute or concentrated) is then slowly added to the solution until the pH drops to about 4.0-5.2, and preferably within a range of 4.8-5.0. The solution is stirred vigorously during the addition of the mineral acid and for a short time thereafter to assure complete adsorption of the P. A. or pernicious anemia factor on the particles of free benzoic acid which form in situ in the crude solution as the pH drops below 7. The benzoic acid precipitate with adsorbed P. A. factor is then separated from the acidic reaction mixture and thoroughly washed with saturated benzoic acid solution to remove unwanted extraneous materials as described in Example I.

The resulting semi-dry benzoic acid cake with adsorbed P. A. factor is next vigorously stirred with about 1500-2000 cc. or more of acetone. The amount of acetone or other organic solvent such as ethanol employed will vary depending on the amount of water present in the adsorbent acid cake, and in any event sufficient solvent should be employed to precipitate the P. A. factor. During this operation the benzoic acid dissolves in the acetone and the adsorbed P. A. factor is liberated as a precipitate in the acetone solution. While the precipitate may be separated in any desired manner, it is preferred to employ filtration under vacuum, followed by washing with acetone and drying free from acetone as rapidly as possible as described in Example I. The acetone-free material rich in P. A. factor may also be dried completely under vacuum and be stored as a dry powder or be reconstituted in aqueous solvents in the same manner as the antigen concentrates. This relatively simple process is a distinct improvement over prior processes employing alcoholic precipitation in the preparation of liver extract concentrates. It avoids, for example, the expense of concentrating the original dilute crude extract as well as the use of large quantities of alcohol, e. g. a 92% concentration of ethanol. In addition to process advantages, the process of the present invention produces improved stable P. A. factor-rich liver extract concentrates low in unwanted solids including protein degradation products such as polypeptides, amino acids, pigmenting materials and the like. These contaminates are inactive in P. A. factor and tend to precipitate on standing. Other advantages in the liver extract process and resulting concentrates are similar to those described above in the antigen field.

I claim:

1. The process of preparing an antigen-rich diphtherial toxoid concentrate from a crude aqueous diphtherial toxoid solution contaminated with culture media and bacterial products, which comprises adjusting the pH of the crude toxoid solution to about 7, dissolving sodium benzoate in the neutral toxoid solution, adding sufficient hydrochloric acid to the sodium benzoate-toxoid solution to lower the pH of the solution to about 4.8-5.0, separating the resulting benzoic acid precipitate with adsorbed toxoid from the aqueous reaction mixture, dissolving the benzoic acid precipitate in acetone, adding a small amount of sodium benzoate to the resulting solution and recovering the resulting toxoid precipitate from the acetone-benzoic acid solution.

2. The process of preparing an antigen-rich tetanal toxoid concentrate from a crude aqueous tetanal toxoid solution contaminated with culture media and bacterial products, which comprises adjusting the pH of the crude toxoid solution to about 7, dissolving sodium benzoate in the neutral toxoid solution, adding sufficient hydrochloric acid to the sodium benzoate-toxoid solution to lower the pH of the solution to about 4.8-5.0, separating the resulting benzoic acid precipitate with adsorbed toxoid from the aqueous reaction mixture, dissolving the benzoic acid precipitate in acetone, adding a small amount of sodium benzoate to the resulting solution and recovering the resulting toxoid precipitate from the acetone-benzoic acid solution.

3. The process of preparing an antigen-rich scarlet fever toxin concentrate from a crude aqueous scarlet fever toxin solution contaminated with culture media and bacterial products, which comprises adjusting the pH of the crude toxin solution to about 7, dissolving sodium benzoate in the neutral toxin solution, adding sufficient hydrochloric acid to the sodium benzoate-toxin solution to lower the pH of the solution to about 4.8–5.0, separating the resulting benzoic acid precipitate with adsorbed toxin from the aqueous reaction mixture, dissolving the benzoic acid precipitate in acetone, adding a small amount of sodium benzoate to the resulting solution and recovering the resulting toxin precipitate from the acetone-benzoic acid solution.

4. The process of preparing an antigen-rich pertussal toxin concentrate from a crude aqueous pertussal toxin solution contaminated with culture media and bacterial products, which comprises adjusting the pH of the crude toxin solution to about 7, dissolving sodium benzoate in the neutral toxin solution, adding sufficient hydrochloric acid to the sodium benzoate-toxin solution to lower the pH of the solution to about 4.8–5.0, separating the resulting benzoic acid precipitate with adsorbed toxin from the aqueous reaction mixture, dissolving the benzoic acid precipitate in acetone, adding a small amount of sodium benzoate to the resulting solution and recovering the resulting toxin precipitate from the acetone-benzoic acid solution.

5. The process of preparing an antigen-rich diphtherial toxoid concentrate from a crude aqueous diphtherial toxoid solution, which comprises dissolving an alkali metal benzoate salt in a crude diphtherial toxoid solution having a pH of at least as high as about the neutral point, adding sufficient mineral acid to the benzoate salt-toxoid solution to lower the pH of the solution to about 4.0–5.2, separating the resulting benzoic acid precipitate with adsorbed toxoid from the acidic aqueous solution, dissolving the benzoic acid precipitate in an inert organic solvent, adding a small amount of a soluble electrolyte to the resulting solution and recovering the liberated toxoid from the benzoic acid solution.

6. The process of preparing an antigen-rich antigen concentrate from a crude aqueous bacterial antigen solution, which comprises dissolving an alkali metal benzoate salt in a crude antigen solution having a pH of at least as high as about the neutral point, adding sufficient mineral acid to the benzoate salt-antigen solution to lower the pH of the solution to about 4.0–5.2, separating the resulting benzoic acid precipitate with adsorbed antigen from the acidic aqueous solution, dissolving the benzoic acid precipitate in an inert organic solvent, adding a small amount of an electrolyte to the resulting solution and recovering the liberated antigen from the benzoic acid solution.

FLOYD H. EGGERT.

References Cited in the file of this patent

UNITED STATES PATENTS

| Number | Name | Date |
|---|---|---|
| 2,035,642 | Doisy | Mar. 31, 1936 |
| 2,073,354 | Schoeller | Mar. 9, 1937 |
| 2,364,760 | Sandweiss | Dec. 12, 1944 |
| 2,385,443 | Hoffmann | Sept. 25, 1945 |
| 2,398,185 | Lee | Apr. 9, 1946 |

OTHER REFERENCES

Katzman in J. of Biol, Chem., Nov. 1932, pages 739–754, pages 745–754 relied on.